US008908169B2

(12) United States Patent
Nagai (10) Patent No.: US 8,908,169 B2
(45) Date of Patent: Dec. 9, 2014

(54) MEASURING METHOD AND MEASURING INSTRUMENT (75) Inventor: Katsuyuki Nagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 699 days.

(21) Appl. No.: 13/182,675

(22) Filed: Jul. 14, 2011

(65) Prior Publication Data

US 2012/0081691 A1 Apr. 5, 2012

(30) Foreign Application Priority Data

Sep. 30, 2010 (JP) ................. 2010-220186

(51) Int. Cl.
| G01C 3/04 | (2006.01) |
| G01S 7/48 | (2006.01) |
| G01S 17/89 | (2006.01) |
| G01C 1/04 | (2006.01) |
| G01S 7/497 | (2006.01) |
| G01C 15/00 | (2006.01) |
| G01S 17/42 | (2006.01) |
| G03B 37/00 | (2006.01) |
| G01C 3/08 | (2006.01) |
| G01S 7/481 | (2006.01) |

(52) U.S. Cl.
CPC ............. *G01S 7/4972* (2013.01); *G01S 7/4808* (2013.01); *G01C 1/04* (2013.01); *G01C 3/08* (2013.01); *G01S 17/89* (2013.01); *G01S 7/4817* (2013.01); *G01C 15/002* (2013.01); *G01S 17/42* (2013.01); *G03B 37/00* (2013.01); *G01C 3/04* (2013.01)
USPC .................. 356/139.06; 356/139.1

(58) Field of Classification Search
CPC ... G01S 7/4808; G01S 7/4817; G01S 7/4972; G01S 17/89; G01S 17/42
USPC .......................... 356/139.06, 139.1
See application file for complete search history.

(56) References Cited

U.S. PATENT DOCUMENTS 3,002,417 A * 10/1961 Harth .................. 250/203.1
H000933 H * 7/1991 Buczek et al. ............. 356/5.09

(Continued)

FOREIGN PATENT DOCUMENTS

| JP | 3-125926 A | 5/1991 |
| JP | 4-178514 A | 6/1992 |

(Continued)

OTHER PUBLICATIONS

Driels, Morris R., and Uday S. Pathre. "Robot calibration using an automatic theodolite." The International Journal of Advanced Manufacturing Technology9.2 (1994): 114-125. http://link.springer.com/article/10.1007%2FBF01750418#.*

(Continued)

*Primary Examiner* — Ari M Diacou
(74) *Attorney, Agent, or Firm* — Nields, Lemack & Frame, LLC (57) ABSTRACT

The invention provides a measuring method for performing monitoring measurement on a plurality of measuring points by using a measuring instrument, which comprises a telescope unit, a distance measuring unit, an image sensor, angle detecting units for detecting a directional angle in sighting direction, and an arithmetic unit. The monitoring measurement comprises a coarse monitoring measurement for acquiring a digital image in measuring direction and for performing angle measurement on the measuring point, and a precise monitoring measurement for performing sighting of the measuring point by the telescope unit and for performing distance measurement and angle measurement, and wherein the coarse monitoring measurement is executed on each of the measuring points, a deviation of a result of the coarse measurement by the coarse monitoring measurement from the initial value is determined, and the precise monitoring measurement is executed on the measuring point where the deviation exceeds a first threshold value.

6 Claims, 9 Drawing Sheets

(56) References Cited

U.S. PATENT DOCUMENTS

| | | | |
|---|---|---|---|
| 5,638,164 A * | 6/1997 | Landau | 356/5.01 |
| 5,996,702 A * | 12/1999 | Hall | 172/4.5 |
| 6,559,931 B2 | 5/2003 | Kawamura et al. | |
| 6,584,213 B2 | 6/2003 | Prakash et al. | |
| 6,734,952 B2 * | 5/2004 | Benz et al. | 356/5.01 |
| 7,750,849 B2 | 7/2010 | Hjelmstad | |
| 7,832,137 B2 | 11/2010 | Sammut et al. | |
| 8,379,191 B2 * | 2/2013 | Braunecker et al. | 356/4.07 |
| 2002/0135509 A1 * | 9/2002 | Talbot et al. | 342/127 |
| 2003/0048438 A1 | 3/2003 | Kawamura et al. | |
| 2003/0169414 A1 * | 9/2003 | Benz et al. | 356/5.1 |
| 2004/0252313 A1 | 12/2004 | Labat et al. | |
| 2006/0191148 A1 * | 8/2006 | Lippuner | 33/290 |
| 2006/0271298 A1 * | 11/2006 | MacIntosh et al. | 702/5 |
| 2009/0138233 A1 | 5/2009 | Kludas et al. | |
| 2011/0032507 A1 * | 2/2011 | Braunecker et al. | 356/5.01 |
| 2012/0081690 A1 | 4/2012 | Nagai | |

FOREIGN PATENT DOCUMENTS

| | | |
|---|---|---|
| JP | 8-136218 A | 5/1996 |
| JP | 10-47959 A | 2/1998 |
| JP | 2879578 B2 | 4/1999 |
| JP | 2003-279352 A | 10/2003 |

OTHER PUBLICATIONS

Driels, Morris R., and Uday S. Pathre. "Vision-based automatic theodolite for robot calibration." Robotics and Automation, IEEE Transactions on 7.3 (1991): 351-360.*

Office Action mailed Mar. 14, 2013 in co-pending U.S. Appl. No. 13/182,670.

European Search Report mailed May 14, 2013 in co-pending European Patent Application No. EP 11005840.1.

Final Rejection mailed Aug. 14, 2013 in co-pending U.S. Appl. No. 13/182,670.

Notice of Allowance mailed Dec. 6, 2013 in co-pending U.S. Appl. No. 13/182,670.

* cited by examiner

MEASURING METHOD AND MEASURING INSTRUMENT

BACKGROUND OF THE INVENTION

The present invention relates to a measuring method and a measuring instrument to measure a multiple number of points periodically or continuously over time.

For the purpose of observing the sinking of ground, of observing landslide, of observing displacement of banks and walls of construction work such as a dam, of observing displacement of wall surface of a tunnel, measurement is performed periodically or continuously over time by using a measuring instrument on a multiple number of measuring points, which are set up in a measurement range.

For instance, in case where a tunnel is to be constructed to build underground railway, for the purpose of observing whether ceiling and wall surface of the tunnel constructed may not be displaced or not, a multiple number of prisms are installed on the ceiling and on the wall surface as targets, and positional displacement of all these prisms are measured one after another without operator intervention by using a measuring instrument (hereinafter, this is referred as "monitoring measurement").

Because automatic sighting and distance measurement must be performed each time when distance measurement and angle measurement are to be carried out on each of the measuring points, in case there are a multiple number of measuring points, much time is required for a single monitoring measurement, and the time required for the monitoring measurement will be longer. Therefore, there has been an apprehension that a delay in discovering a change is caused when any change occurs on the measuring point.

SUMMARY OF THE INVENTION

It is an object of the present invention to provide a measuring method and a measuring instrument, by which it is possible to shorten the time for measurement in case monitoring measurement is performed on a plurality of measuring points, to reduce cycling time of the monitoring measurement and to make it possible to detect a change at an earliest chance in case where there is any change at the measuring points.

The present invention provides a measuring method for performing monitoring measurement on a plurality of measuring points by using a measuring instrument, which comprises a telescope unit for performing sighting of a measuring point where an initial value is already known, a distance measuring unit for measuring a distance to the measuring point by projecting a distance measuring light through the telescope unit, an image sensor for taking an image in direction of measurement and for acquiring a digital image, angle detecting units each for detecting a directional angle in sighting direction of the telescope unit, and an arithmetic unit for making the telescope unit perform automatic sighting to the measuring point and for calculating directional angles of the measuring point based on a deviation of the measuring point on the digital image from a sighting axis and based on a result of detection from the angle detecting unit, wherein the monitoring measurement comprises a coarse monitoring measurement for acquiring a digital image in measuring direction and for performing angle measurement on the measuring point from the digital image, and a precise monitoring measurement for performing sighting of the measuring point by the telescope unit and for performing distance measurement by the distance measuring unit and angle measurement by the angle detecting unit, and wherein the coarse monitoring measurement is executed on each of the measuring points, a deviation of a result of the coarse measurement by the coarse monitoring measurement from the initial value is determined, and the precise monitoring measurement is executed on the measuring point where the deviation exceeds a first threshold value.

Also, the present invention provides the measuring method as described above, wherein the coarse monitoring measurement comprises a step of directing the telescope unit toward the measuring point based on the initial value and of acquiring a digital image, a step of measuring a directional angle of a sighting axis of the telescope unit, a step of calculating the deviation of the measuring point in the digital image with respect to the sighting axis, and a step of determining the directional angles of the measuring point based on a vertical angle, a horizontal angle, and the deviation.

Further, the present invention provides the measuring method as described above, wherein the coarse monitoring measurement is performed so that the telescope unit performs scanning over a preset range, and the coarse monitoring measurement comprises a step of setting scanning speed and image pickup time interval in such manner that an image of the object to be measured is included in at least two digital images, being adjacent to each other in terms of time, and a step of averaging the obtained measurement result.

Also, the present invention provides the measuring method as described above, wherein an alarm signal is issued when a deviation of the measurement result of the precise monitoring measurement from the initial value exceeds a second threshold value.

Further, the present invention provides the measuring method as described above, wherein the method comprises a step of acquiring an image of the background in the measuring direction at the same time as the execution of the coarse monitoring measurement or as the execution of the precise monitoring measurement, and a step of judging a non-measurable state according to an image of the background in case the coarse monitoring measurement or the precise monitoring measurement cannot be performed.

Also, the present invention provides a measuring instrument, comprising a telescope unit for performing sighting of a measuring point where an initial value is already known, a distance measuring unit for measuring a distance to the measuring point by projecting a distance measuring light through the telescope unit, an image sensor for taking an image in sighting direction and for acquiring a digital image, angle detecting units each for detecting a directional angle in sighting direction of the telescope unit, an automatic sighting unit for making the telescope unit perform automatic sighting on the measuring point, an image processing unit for detecting the measuring point in the digital image and for calculating a field angle with respect to a sighting axis of a telescope, and an arithmetic unit, wherein the arithmetic unit directs the telescope unit toward the measuring point according to the initial value, calculates directional angles of the measuring point based on the directional angle detected by the angle detecting unit and also based on the field angle, acquires the directional angles thus calculated as a result of coarse monitoring measurement, and in case the result of the coarse monitoring measurement exceeds a first threshold value, the arithmetic unit makes the telescope unit direct toward the measuring point exceeding the first threshold value, makes the telescope unit perform automatic sighting, carries out distance measurement and angle measurement by the distance measuring unit and the angle measuring unit and acquires the measurement result as a result of the precise monitoring measurement.

Further, the invention provides the measuring instrument as described above, wherein the telescope unit has an image pickup unit for taking an image of background in the measuring direction, and in case where the result of coarse monitoring measurement or the result of precise monitoring measurement cannot be obtained, the arithmetic unit acquires an image of the background in direction of the measuring point where measurement result cannot be obtained by the image pickup unit.

The present invention provides a measuring method for performing monitoring measurement on a plurality of measuring points by using a measuring instrument, which comprises a telescope unit for performing sighting of a measuring point where an initial value is already known, a distance measuring unit for measuring a distance to the measuring point by projecting a distance measuring light through the telescope unit, an image sensor for taking an image in direction of measurement and for acquiring a digital image, angle detecting units each for detecting a directional angle in sighting direction of the telescope unit, and an arithmetic unit for making the telescope unit perform automatic sighting to the measuring point and for calculating directional angles of the measuring point based on a deviation of the measuring point on the digital image from a sighting axis and based on a result of detection from the angle detecting unit, wherein the monitoring measurement comprises a coarse monitoring measurement for acquiring a digital image in measuring direction and for performing angle measurement on the measuring point from the digital image, and a precise monitoring measurement for performing sighting of the measuring point by the telescope unit and for performing distance measurement by the distance measuring unit and angle measurement by the angle detecting unit, and wherein the coarse monitoring measurement is executed on each of the measuring points, a deviation of a result of the coarse measurement by the coarse monitoring measurement from the initial value is determined, and the precise monitoring measurement is executed on the measuring point where the deviation exceeds a first threshold value. As a result, with respect to the measuring points, which show no change, the precise measurement is omitted. Thus, the time required for the monitoring measurement can be reduced.

Also, the present invention provides the measuring method as described above, wherein the coarse monitoring measurement comprises a step of directing the telescope unit toward the measuring point based on the initial value and of acquiring a digital image, a step of measuring a directional angle of a sighting axis of the telescope unit, a step of calculating the deviation of the measuring point in the digital image with respect to the sighting axis, and a step of determining the directional angles of the measuring point based on a vertical angle, a horizontal angle, and the deviation. As a result, the measurement can be carried out by image processing, and there is no need to perform precise sighting, and the time required for the measurement can be extensively shortened.

Further, the present invention provides the measuring method as described above, wherein the coarse monitoring measurement is performed so that the telescope unit performs scanning over a preset range, and the coarse monitoring measurement comprises a step of setting scanning speed and image pickup time interval in such manner that an image of the object to be measured is included in at least two digital images, being adjacent to each other in terms of time, and a step of averaging the obtained measurement result. As a result, the accuracy of the coarse monitoring measurement is improved.

Also, the present invention provides the measuring method as described above, wherein an alarm signal is issued when a deviation of the measurement result of the precise monitoring measurement from the initial value exceeds a second threshold value. As a result, the precise monitoring measurement is performed only on the measuring points, which show changes, and an accurate alarm signal can be issued without requiring much time.

Further, the present invention provides the measuring method as described above, wherein the method comprises a step of acquiring an image of the background in the measuring direction at the same time as the execution of the coarse monitoring measurement or as the execution of the precise monitoring measurement, and a step of judging a non-measurable state according to an image of the background in case the coarse monitoring measurement or the precise monitoring measurement cannot be performed. As a result, it is possible to judge a non-measurable state, which cannot be judged merely from the results of measurement by the image of the background. The procedure at an operation side to judge the non-measurable state is facilitated.

Also, the invention provides a measuring instrument, comprising a telescope unit for performing sighting of a measuring point where an initial value is already known, a distance measuring unit for measuring a distance to the measuring point by projecting a distance measuring light through the telescope unit, an image sensor for taking an image in sighting direction and for acquiring a digital image, angle detecting units each for detecting a directional angle in sighting direction of the telescope unit, an automatic sighting unit for making the telescope unit perform automatic sighting on the measuring point, an image processing unit for detecting the measuring point in the digital image and for calculating a field angle with respect to a sighting axis of a telescope, and an arithmetic unit, wherein the arithmetic unit directs the telescope unit toward the measuring point according to the initial value, calculates directional angles of the measuring point based on the directional angle detected by the angle detecting unit and also based on the field angle, acquires the directional angles thus calculated as a result of coarse monitoring measurement, and in case the result of the coarse monitoring measurement exceeds a first threshold value, the arithmetic unit makes the telescope unit direct toward the measuring point exceeding the first threshold value, makes the telescope unit perform automatic sighting, carries out distance measurement and angle measurement by the distance measuring unit and the angle measuring unit and acquires the measurement result as a result of the precise monitoring measurement. As a result, the time required for the monitoring measurement can be shortened.

Further, the invention provides the measuring instrument as described above, wherein the telescope unit has an image pickup unit for taking an image of background in the measuring direction, and in case where the result of coarse monitoring measurement or the result of precise monitoring measurement cannot be obtained, the arithmetic unit acquires an image of the background in direction of the measuring point where measurement result cannot be obtained by the image pickup unit. As a result, it is possible to judge a non-measurable state, which cannot be judged merely from the results of measurement by the image of the background. This facilitates the procedure at an operation site to judge the non-measurable state is facilitated.

BRIEF DESCRIPTION OF THE DRAWINGS

FIG. 6 each represents an explanatory drawing to show relation between field of view of a telescope and a reflective target in the present embodiment. FIG. 6 (A) shows a case where a single reflective target is included in a field of view of a telescope, and FIG. 6 (B) shows a case where two reflective targets are included in the field of view of the telescope.

DETAILED DESCRIPTION OF THE PREFERRED EMBODIMENTS

Description will be given below on an embodiment of the present invention by referring to the attached drawings.

First, referring to FIG. 1, description will be given on a measuring system provided with a measuring instrument according to the present invention.

Figure 1:
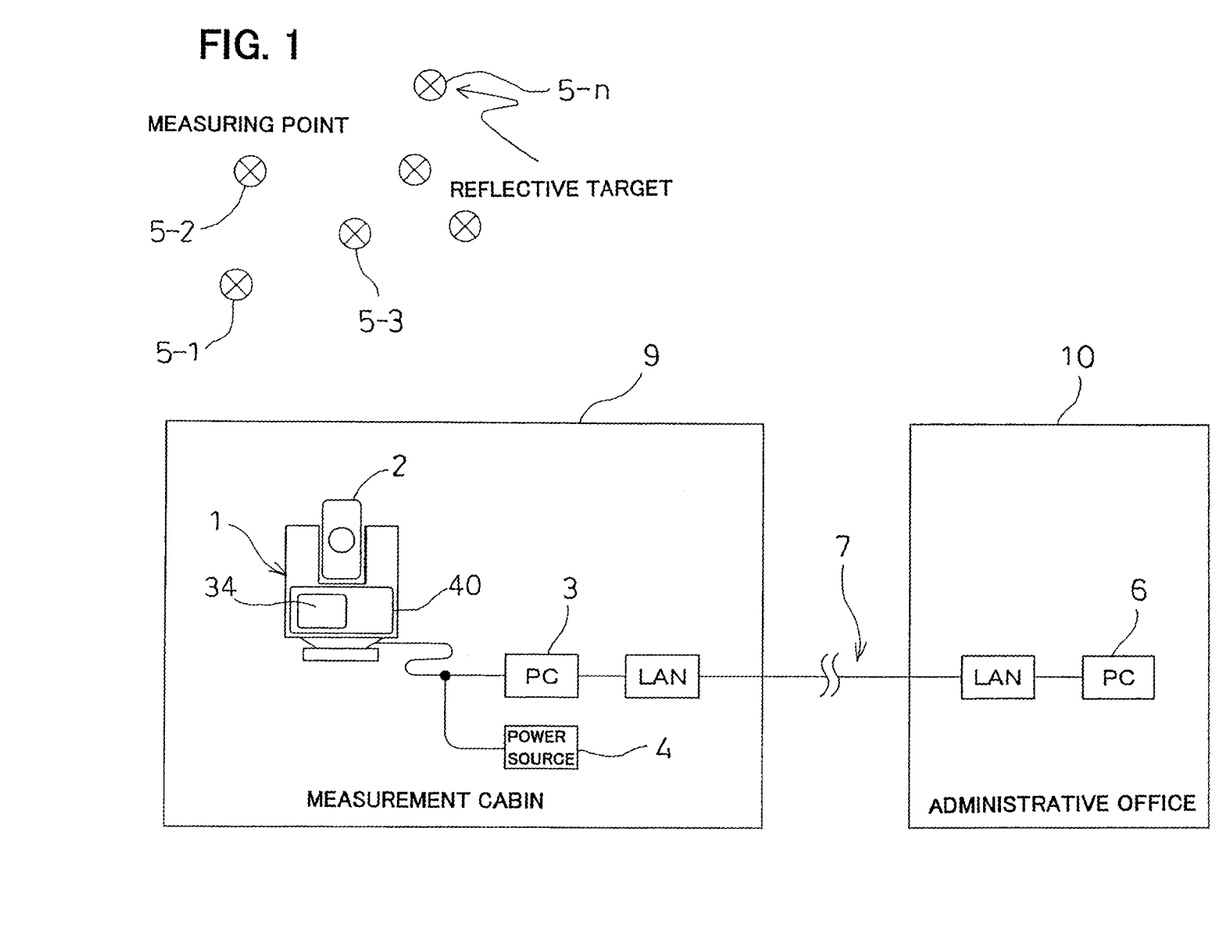
FIG. 1 is a schematical drawing to show system configuration, which includes a measuring instrument according to an embodiment of the present invention.

In FIG. 1, reference numeral 1 represents a measuring instrument to be installed in a measurement cabin 9. The measuring instrument 1 has a telescope unit 2 and can rotate the telescope unit 2 in horizontal and vertical directions, and the measuring instrument 1 has an automatic sighting function. Numeral 3 represents a measuring instrument PC. This measuring instrument PC 3 is electrically connected to the measuring instrument 1, or is integrated with the measuring instrument 1. The measuring instrument PC 3 issues instructions relating to the measurement to the measuring instrument 1, accumulates measurement data as acquired at the measuring instrument 1 or transmits the measured data to a base station PC 6. Numeral 4 represents a power source, and the power source 4 supplies electric power to the measuring instrument 1 and the measuring instrument PC 3. Although not shown in the figure, the measuring instrument 1 has a measuring function and has a horizontal angle measuring unit and a vertical angle measuring unit (see FIG. 3) for detecting the sighting direction of the telescope unit 2. Reference numerals 5-1, 5-2, 5-3, . . . 5-n each represents a reflective target installed at a measuring point.

The base station PC 6 is installed at an administrative office 10 to manage and administer tunnels, dams, etc. The base station PC 6 accumulates monitoring data transmitted from the measuring instrument PC 3 and compares the received monitoring data with the monitoring data received in the past, and judges the present state of tunnels, dams, etc.

The measuring instrument PC 3 and the base station PC 6 can transmit and receive data communication to and from each other via a communication means 7 as required such as LAN, telephone line, wireless communication, etc.

Figure 2:
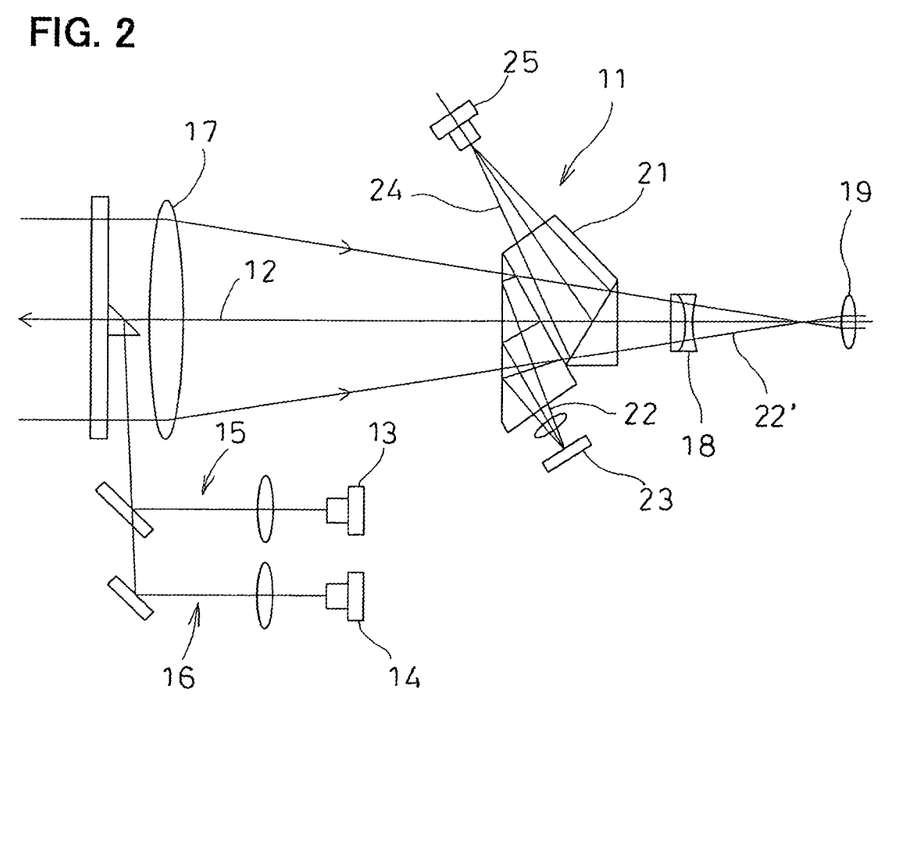
FIG. 2 is a drawing to show an optical system provided on the measuring instrument as described above.

FIG. 2 shows an optical system 11 of the measuring instrument 1. In FIG. 2, reference numeral 12 represents an optical axis (sighting axis) of the optical system 11, numeral 13 represents a light source for distance measurement, numeral 14 represents a light source for sighting, numeral 15 represents a first light projecting optical system for guiding a distance measuring light from the light source 13 for distance measurement toward the optical axis 12, numeral 16 represents a second light projecting optical system for guiding a sighting light from the light source 14 for sighting toward the optical axis 12, numeral 17 represents an objective lens disposed along the optical axis 12, numeral 18 represents a focus lens disposed on the optical axis 12, and numeral 19 represents an eye piece.

The light source 13 for distance measurement emits a visible light as a distance measuring light, and the light source 14 for sighting emits a non-visible light such as infrared light as a sighting light. The distance measuring light emitted from the light source 13 for distance measurement and the sighting light emitted from the light source 14 for sighting are projected along the optical axis 12 respectively. A reflection light of the distance measuring light (hereinafter referred as a "reflected distance measuring light") and a reflection light of the sighting light (hereinafter referred as a "reflected sighting light") enter the objective lens 17 and are converged.

Along the optical axis 12, a dichroic prism 21 is disposed. The dichroic prism 21 reflects a reflected sighting light 22. The reflected sighting light 22 is separated by the dichroic prism 21, and a part of the reflected sighting light 22 thus separated by the reflection enters an image sensor 23. A reflected distance measuring light 24 is reflected and separated by the dichroic prism 21, and the reflected distance measuring light 24 thus separated enters a photodetection element 25 for distance measurement. After passing through the dichroic prism 21, a natural light 22' passes through the focus lens 18 and enters the eye piece 19.

The image sensor 23 is CCD, CMOS sensor, etc., each of which is an aggregate of pixels, for instance, and the image sensor 23 outputs a digital signal. A position of the received pixel can be specified on a light receiving surface (image pickup surface). Further, it is so designed that a center of the image sensor 23 coincides with the optical axis 12. By obtaining a position of the pixel on the image sensor 23, a field angle with respect to the optical axis 12 (i.e. an angle with respect to the optical axis determined from the position of the pixel) can be acquired. The optical system 11, the image sensor 23, etc. make up together an image pickup unit, which takes a digital image.

In the present embodiment, the reflective target 5 is detected from the digital image acquired by the image sensor 23, and it is so designed that a position of the reflective target 5 on the image is detected and a position of the reflective target 5 (a vertical angle and a horizontal angle) are detected from a vertical angle and a horizontal angle of the optical axis 12.

Figure 3:
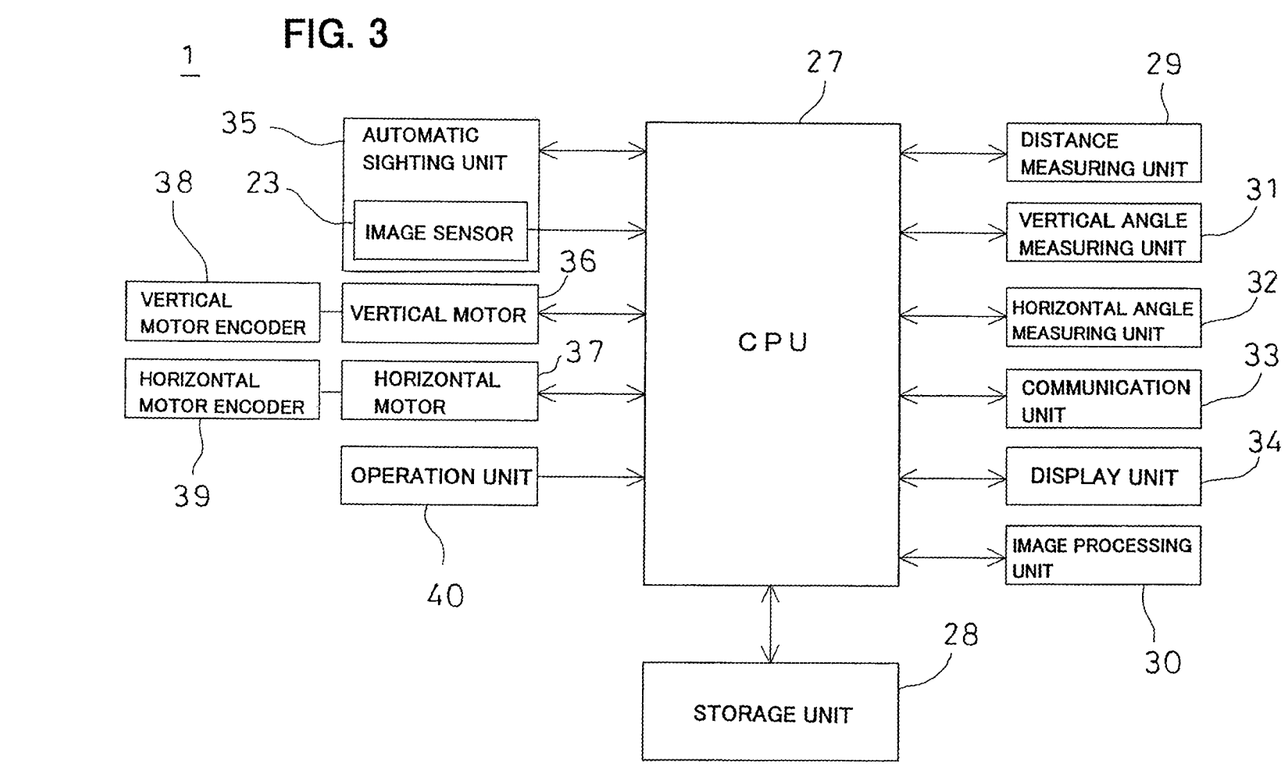
FIG. 3 is a schematical block diagram of the measuring instrument as given above.

FIG. 3 is a schematical block diagram to show an approximate system configuration of the measuring instrument 1. In FIG. 3, reference numeral 27 represents an arithmetic unit typically represented by CPU, numeral 28 represents a storage unit, numeral 29 represents a distance measuring unit, numeral 30 represents an image processing unit, numeral 31 represents a vertical angle measuring unit, numeral 32 represents a horizontal angle measuring unit, numeral 33 represents a communication unit, numeral 34 represents a display unit, numeral 35 represents an automatic sighting unit, numeral 36 represents a vertical motor for rotating the telescope unit 2 in vertical direction, numeral 37 represents a horizontal motor for rotating the telescope unit 2 in horizontal direction, numeral 38 represents a vertical motor encoder installed on the vertical motor 36, numeral 39 represents a horizontal motor encoder installed on the horizontal motor 37, and numeral 40 represents an operation unit.

The storage unit 28 has a program storage region and a data storage region. In the program storage region, various types of programs are stored. These programs include: a measurement program for making the measuring instrument 1 perform the measuring operation and for acquiring three-dimensional data of each of the measuring points (i.e. the reflective target 5), and a sequence program for sequentially searching the measuring points and for carrying out operation such as acquisition of images by the image sensor 23, an image processing program for detecting the reflective target 5 from the image acquired by the image sensor 23, and an automatic sighting program for performing sighting of the telescope unit 2 to the reflective target 5 based on the result of detection of the reflective target 5, and a teaching program for executing the automatic sighting program and the measurement program and for carrying out teaching operation based on the data measured on each of the reflective targets 5, a monitoring program for carrying out the automatic sighting program and the measurement program at a predetermined time interval based on the results of the teaching operation, for detecting a position of each of the measuring points and for storing the results of detection to the storage unit 28 in time series, and other types of programs.

Also, in the data storage region of the storage unit 28, teaching data (initial values) of each reflective target 5 obtained through the execution of the teaching operation are stored. A result of coarse measurement as to be described later, a result of precise measurement are associated with each of the reflective targets 5 and are stored in time series.

The distance measuring unit 29 comprises the light source 13 for distance measurement, the photodetection element 25 for distance measurement, the arithmetic unit 27, the storage unit 28, etc., and the distance measuring unit 29 performs distance measurement based on the reflected distance measuring light as received at the photodetection element 25 for distance measurement.

The automatic sighting unit 35 comprises the light source 14 for sighting, the image sensor 23, the arithmetic unit 27, the storage unit 28, and the automatic sighting program, etc. A reflected sighting light from the reflective target 5 is received at the image sensor 23, and automatic sighting is performed so that a sighting optical axis coincides with the reflective target 5 based on the result of light receiving.

The image processing unit 30 is driven and controlled by the image processing program. Based on an image signal from the image sensor 23, the reflective target 5 is detected. Further, a field angle of the reflective target 5 is calculated from the position of the reflective target 5 on the image sensor 23.

The vertical angle measuring unit 31 measures a vertical angle of the sighting optical axis of the telescope unit 2 and sends the result of the measurement to the arithmetic unit 27 as an electric signal. The horizontal angle measuring unit 32 has a reference point and measures a horizontal angle of the sighting optical axis with respect to the reference point, and the result of the measurement is sent to the arithmetic unit 27.

The vertical motor 36 and the horizontal motor 37 are driven and controlled by the arithmetic unit 27. A rotation amount and a rotation speed of the vertical motor 36 are detected by the vertical motor encoder 38 installed on the vertical motor 36, and a rotation amount and a rotation speed of the horizontal motor 37 are detected by the horizontal motor encoder 39 installed on the horizontal motor 37.

According to the programs such as the sequence program and the image processing program, etc. as stored in the storage unit 28, the arithmetic unit 27 performs scanning over a preset measurement range and controls the image processing unit 30 in the process of scanning. Then, based on the image signal from the image sensor 23, each of the reflective targets 5 is detected, and a field angle of each of the reflective targets 5 is obtained. Further, based on the results of detection by the vertical angle measuring unit 31 and the horizontal angle measuring unit 32, a vertical angle and a horizontal angle of each of the targets 5 are determined (by coarse measurement) from the image.

Further, the arithmetic unit 27 compares the vertical angle and the horizontal angle obtained by coarse measurement with the initial values. In case a deviation obtained through the comparison is within a predetermined threshold value, the arithmetic unit 27 judges that there is no change in the measuring point, and continues the monitoring measurement by the coarse measurement. In case the deviation obtained by the comparison of the vertical angle and the horizontal angle obtained in the coarse measurement with the initial values exceeds a preset threshold value, the arithmetic unit 27 carries out the automatic sighting program and the measurement program and performs automatic sighting with respect to the reflective target 5 which exceeded the threshold value. Then, distance measurement by the distance measuring unit 29 and angle measurement by the vertical angle measuring unit 31 and the horizontal angle measuring unit 32 are carried out, and three-dimensional measurement (precise measurement) is performed. The arithmetic unit 27 compares the results of the precise measurement thus obtained with the initial values. If the obtained deviation exceeds the threshold value, the arithmetic unit 27 judges as an abnormality and transmits an alarm signal and the monitoring data to the base station PC 6 via the communication means 7.

As to be described below, it may be so designed that the measuring instrument PC 3 only transmits the measuring point data to the base station PC 6. The comparison of and the results of the coarse measurement and the results of the precise measurement with the initial values, and the judgment on an abnormality based on the results of the comparison may be made by the base station PC 6.

Next, description will be given below on the measuring unit PC 3.

The measuring instrument 1 executes the teaching operation or the monitoring operation and the data of the measuring points such as the initial value, coarse measurement data, precise measurement data, etc. obtained by the teaching operation and the monitoring operation are transmitted to the measuring instrument PC 3. The measuring instrument PC 3 matches the data of the measuring points to each of the reflective targets 5 in time series and reserves and stores the data of the measuring points in time series. It may be so designed that the measuring instrument PC 3 has the teaching program to make the measuring instrument 1 perform the teaching operation and according to instructions from the measuring instrument PC 3, the measuring instrument 1 perform the teaching operation.

Further, the measuring instrument PC 3 has programs such as a control program for making the measuring instrument 1 carry out the teaching or the monitoring and an abnormality judging program for calculating based on the measurement data as to whether there is displacement or not and as to the extent of displacement for each of the reflective targets (measuring points) and for judging whether there is any abnormality or not.

In case where the abnormality of the measuring point is judged by the measuring instrument PC 3, it may be so designed that the processing such as issuance of the alarm signal can be carried out at the base station PC 6 based on the information of the judgment on the abnormality from the measuring instrument PC 3.

Description will be given below on the monitoring measurement in the present embodiment. As the preparation to carry out the monitoring measurement, it is necessary to perform the teaching operation to obtain the initial values.

Figure 4:
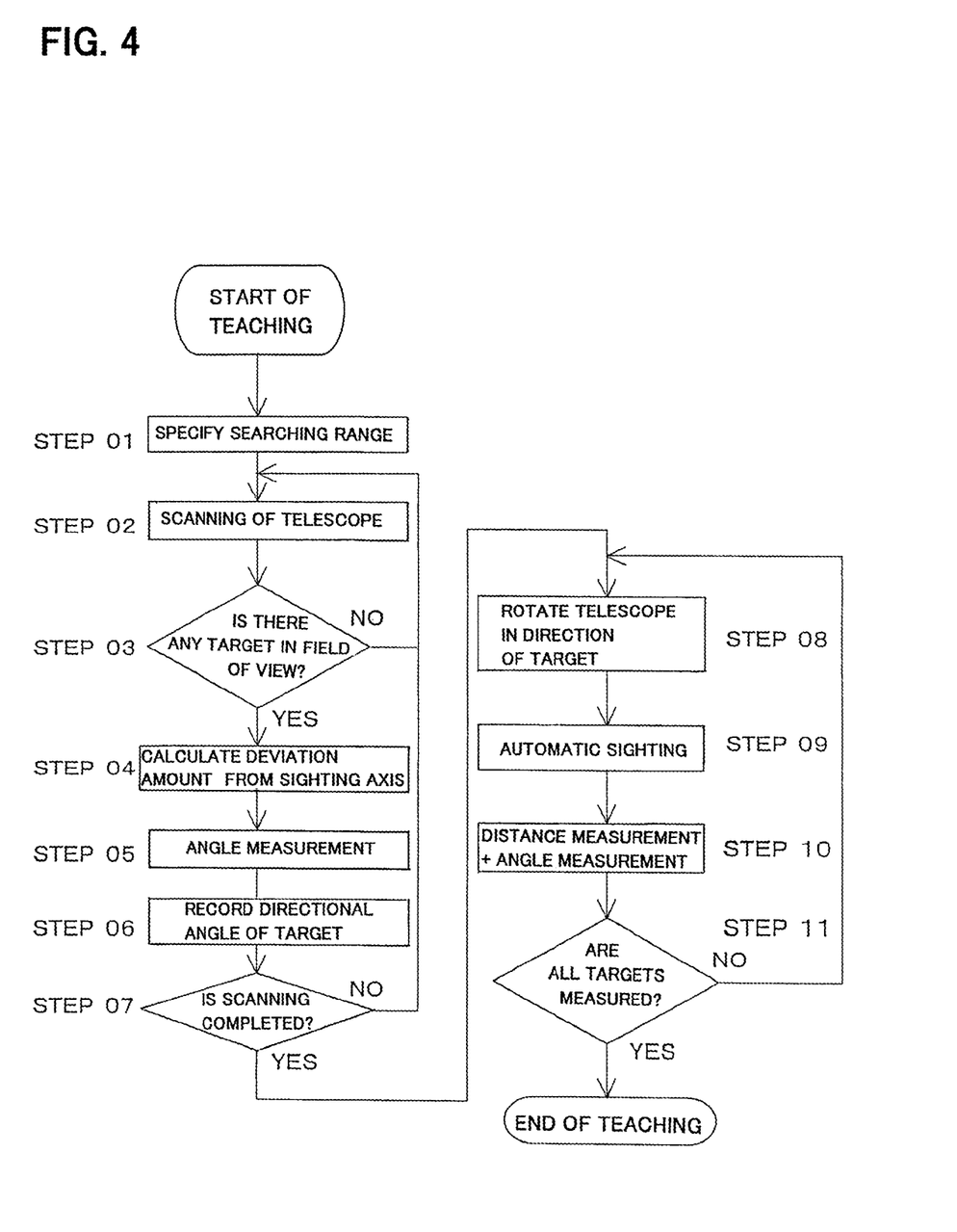
FIG. 4 is a flowchart to show teaching operation in the embodiment of the present invention.

First, by referring to FIG. 4 and FIG. 5, description will be given on the teaching operation.

(Step 01)

A reference point and a range where the measuring point is present (i.e. a searching range) are specified. As a method to specify the range, for instance, the display unit may be designed as a touch panel, and the searching range may be specified from an image displayed on the touch panel.

(Step 02) When the specifying of the searching range has been completed, a searching operation is carried out. A coarse measurement is carried out through the image processing with respect to the objects to be measured within the searching range, and through the angle measurement of a field angle obtained by image processing and the measured angle in the sighting direction of the telescope unit 2. The execution of the searching operation and the execution of the coarse measurement are instructed from the measuring instrument PC 3.

Figure 5:
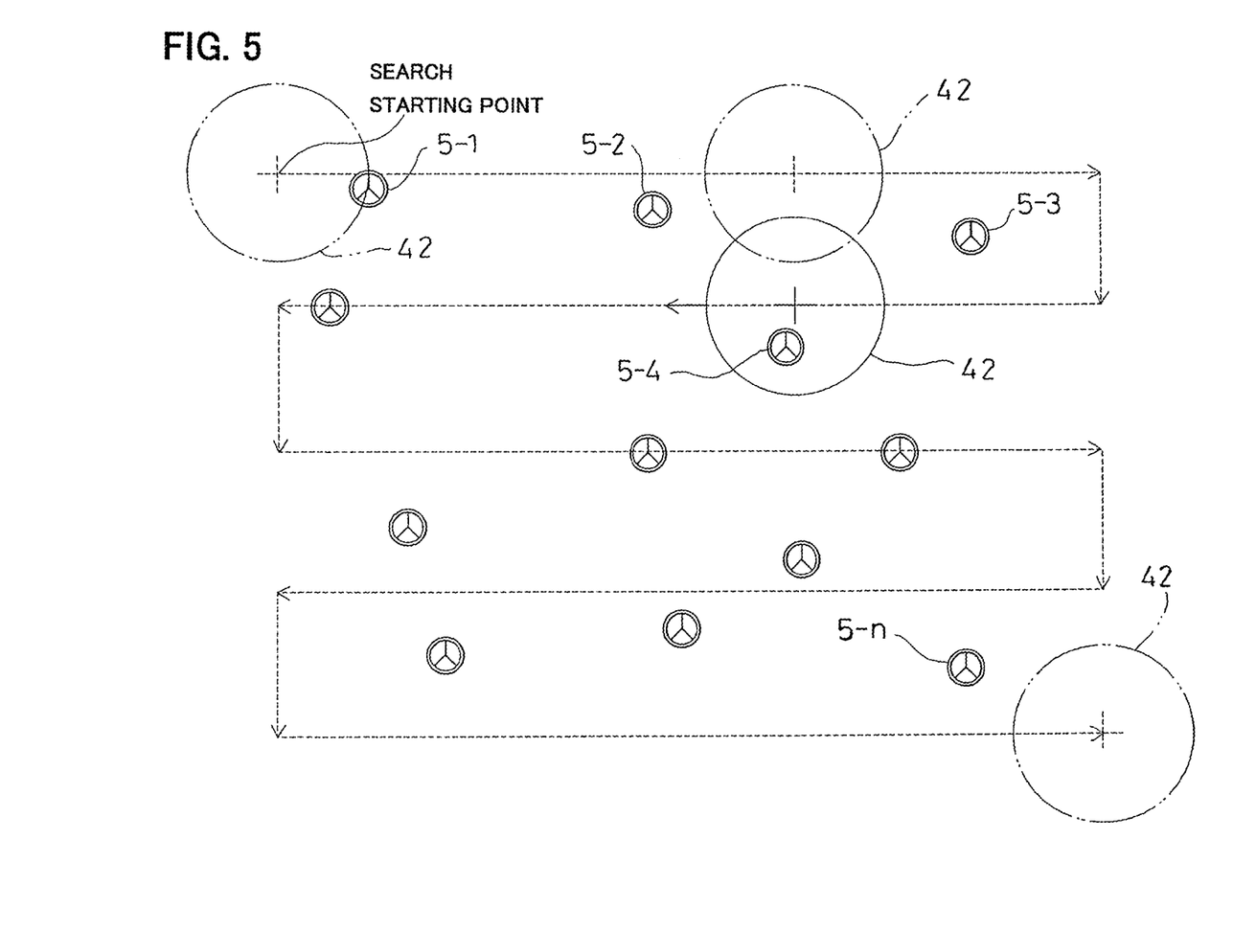
FIG. 5 is an explanatory drawing to show a relation of scanning loci, field of view of a telescope and a reflective target in the present embodiment.

FIG. 5 shows condition of the searching operation. When the searching range is specified, by using the searching function of the measuring instrument 1, the vertical motor 36 and the horizontal motor 37 are driven, and the telescope unit 2 is reciprocally scanned in horizontal direction, and is rotated in vertical direction at a predetermined angle at the end of horizontal scanning. By reciprocal scanning in horizontal direction and by the rotation in vertical direction at the end of the horizontal scanning, scanning can be performed over total searching range. In this case, the predetermined rotation angle in vertical direction will be set to an angle smaller than the view angle in vertical direction of a field of view 42 of the telescope unit 2 so that the field of view in the upper scanning and the field of view in the lower scanning will be superimposed on each other in a predetermined range.

(Step 03) Scanning is performed at a predetermined speed, and image data are acquired by the image sensor 23 at a predetermined time interval during the scanning process. Then, it is detected from the image data as to whether there is the reflective target 5 within field of view of the image sensor 23 or not. No specifying is given on the pattern of the scanning, however, the field of view 42 of the telescope unit 2 is in circular shape. Therefore, in case the scanning is performed in horizontal direction and in case the reflective target 5 is present near an upper end or a lower end of the field of view 42 of the telescope unit 2, the reflective target 5 comes into the field of view 42 only at a single moment. For this reason, the reflective target 5 may not be discovered. Accordingly, the scanning is performed in horizontal direction with superimposed a little in up-to-bottom direction of the field of view 42 (See FIG. 5). Similarly, in case the scanning is performed in vertical direction, the time interval and the scanning speed to acquire the images are set in such manner that the images can be acquired as superimposed a little on each other in left-to-right direction of the field of view 42.

(Step 04) In case the reflective target 5 is discovered in the image obtained during the scanning process, a measured angle value (H1, V1) of the measuring instrument 1 at the moment and a deviation amount (X1, Y1) between the reflective target 5 and the optical axis 12 on the image sensor 23 are measured and determined as a pixel position.

(Step 05) Step 05 is a process of the coarse measurement. The deviation amount (X1, Y1) from the optical axis 12 (sighting axis) is converted to an angle value (field angle) (δH1, δV1). At the time when the deviation amount is obtained, the angle of the optical axis 12 of the telescope unit 2 is acquired from the vertical angle measuring unit 31 and the horizontal angle measuring unit 32. Then, based on the vertical angle and the horizontal angle of the optical axis 12 as detected by the vertical angle measuring unit 31 and the horizontal angle measuring unit 32, and also, based on angle values of the image sensor 23, angle measurement (calculation) is performed on the directional angles (TH, TV) of the reflective target 5 according to the following equation:

$$TH1 = H1 + \delta H1; \ TV1 = V1 + \delta V1$$

(Step 06) Directional angle (TH, TV) of the reflective target 5 thus calculated is associated with the corresponding reflective target 5, and is transmitted to the measuring instrument PC 3. At the measuring instrument PC 3, an identification number is put to the reflective target 5, and the result of angle measurement is associated with the identification number as the result of coarse measurement and is recorded in time series. The results of the angle measurement thus recorded will be a target value when automatic sighting is carried out as described later.

(Step 07) It is judged whether angle measurement has been carried out for all of the reflective targets 5 or not, and the entire searching range is scanned. Then, the angle measurement is performed on all of the reflective targets 5. The results of the coarse measurement are associated with the reflective target 5 and are stored.

When the measurement (coarse measurement) of the direction angle has been completed for all of the reflective targets 5, three-dimensional measurement (precise measurement) is started on each individual reflective target 5 based on the results of the coarse measurement (angle measurement) of the reflective targets 5.

(Step 08) The results the angle measurement are regarded as target values, and the telescope unit 2 is turned in the direction of the target value corresponding to identification number in a predetermined sequence, e.g. in the sequence of identification number.

(Step 09) When a reflective target 5, on which sighting is to be performed, is present in the direction of a target value and the reflective target 5, on which sighting is to be performed, comes into the field of view 42 of the telescope unit 2, the reflective target 5 in the image of the image sensor 23 is detected. Then, a deviation of the reflective target 5 with respect to the optical axis 12 is obtained, and the vertical motor 36 and the horizontal motor 37 are further driven and controlled so that the deviation will be 0, and automatic sighting is carried out.

(Step 10) When the sighting is completed, the distance measurement is performed by the distance measuring unit 29. At the same time, the angle measurement is carried out on the vertical angle and the horizontal angle by the vertical angle measuring unit 31 and the horizontal angle measuring unit 32. The results of the distance measurement and the results of the angle measurement are associated with the reflective target 5 as teaching data and also associated with the measuring time and are recorded and stored in the storage unit 28. The teaching data may be transmitted to the measuring instrument PC 3 via the communication unit 33 and may be recorded and stored in the measuring instrument PC 3.

(Step 11) When the distance measurement and the angle measurement (precise measurement) have been performed on all of the reflective targets 5, the teaching operation is completed, and the teaching data are stored as the initial values in the storage unit 28 or in the measuring instrument PC 3. When the teaching operation has been completed and the teaching data have been acquired, automatic monitoring measurement can be carried out.

If the initial values of the reference points and the measuring points are determined in advance by the measurement, etc., the teaching operation as described above can be omitted.

Now, brief description will be given below on the monitoring measurement. According to the present embodiment, three modes of monitoring measurement can be carried out: the coarse monitoring measurement, the precise monitoring measurement, or a combination of the coarse monitoring measurement and the precise monitoring measurement. As the coarse monitoring measurement, there are a first coarse monitoring measurement in which the scanning is not performed and the telescope unit 2 at a standstill state and a second coarse monitoring measurement in which the measurement is carried out while performing the scanning.

In the first coarse monitoring measurement, the displacement of the measuring point in the digital image with respect to the sighting axis is detected according to the digital image obtained via the telescope unit 2, which is in standstill state. The displacement may be detected by the comparison of the position of the measuring point as determined from the image with the initial value. Or the image taken previously is compared with the image taken this time and the displacement in planar direction, which perpendicularly crosses the sighting axis, may be detected on the image. In the first coarse monitoring, the displacement in a direction perpendicularly crossing the sighting axis, such as displacement in sinking direction, can be easily measured without carrying out the precise sighting.

Next, by referring to FIG. 6, description will be given on the second coarse monitoring measurement.

By an instruction to start the monitoring measurement from the measuring instrument PC 3, the telescope unit 2 is turned in the direction where the reflective target 5 is present. The directional angle of each of the targets is known from the initial value, and the rotating speed of the telescope unit 2 for moving between the targets may be set higher. When the telescope unit 2 is approximately directed in a direction, which is set as the initial value of the reflective target 5 as aimed by the telescope unit 2, the rotating speed of the telescope unit 2 is decreased, and sampling of the image is performed while the telescope unit is rotated at a predetermined speed. The sampling is performed on the images obtained by the image sensor 23 at a predetermined time interval or at a predetermined angular interval (in the figure, at the predetermined horizontal rotation angle). To increase the measurement accuracy, it is so designed that a plurality of the sampling images can be obtained with respect to a single reflective target 5.

The largest image obtained by the image sensor 23 will be equal to the field of view of the telescope unit 2. From the images thus sampled, the reflective target 5 is detected. Then, angle values ($\delta H$, $\delta V$) of the reflective target 5 in the images are obtained. Further, from the field angle and the sighting direction of the telescope unit 2 at the time of sampling, i.e. from the horizontal angle and the vertical angle (H, V), directional angles (TH, TV) of the reflective target 5 are determined. Even when the measuring point is displaced, there is almost no change in the horizontal distance from the measuring instrument 1 to the measuring point, and these directional angles (TH, TV) are acquired as monitoring data.

Figure 6A:
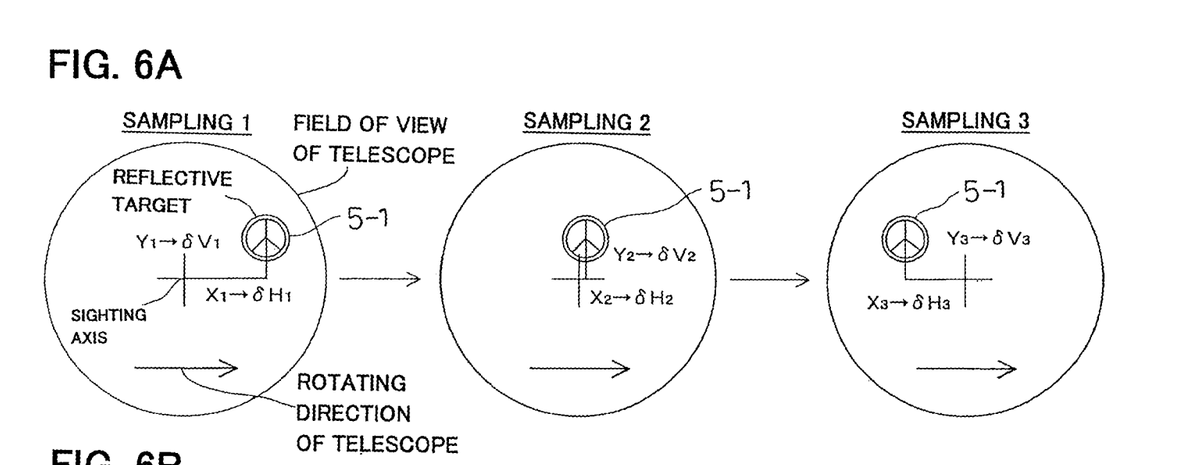

FIG. 6 (A) shows a case where a single reflective target 5 is detected in the field of view of the telescope unit 2 during the coarse monitoring measurement. FIG. 6(A) also shows a case where a single reflective target 5-1 is included in three images, which are adjacent to each other in terms of time in the coarse monitoring measurement. Because the optical axis is moved by the rotation of the telescope unit 2, the position of the reflective target 5 in the image is changed i.e. the position of the reflective target 5 with respect to the optical axis 12 is changed. Therefore, three measurement values (measured angles) can be obtained with respect to the reflective target 5-1, and the three measurement values are averaged. By the averaging, measurement accuracy of the reflective target 5-1 can be improved. In the figure, symbols X and Y each represents a direction of the sighting axis, and the symbol X represents the horizontal angle, and the symbol Y represents the vertical angle.

Therefore, the interval of sampling is preferably an interval that at least two images are obtained on the same reflective target 5 within the time period, during which field of view of the telescope unit 2 passes through the reflective target 5. With respect to the same reflective target 5, at least two or more sampling images each including the reflective target 5 are acquired and by averaging two or more directional angles of the reflective target 5 thus obtained, the accuracy of the monitoring data can be increased.

The directional angles (X, Y) of the sighting axis are detected at real time by the horizontal angle measuring unit 32 and the vertical angle measuring unit 31. Field angles ($\delta H$, $\delta V$) in the image are measured by the image processing unit 30. Based on the directional angles (X, Y) and on the field angles ($\delta H$, $\delta V$), by taking the position of the measuring instrument 1 as the origin point, the directional angle of the reflective target 5 is calculated. If it is supposed that there are no changes in the position of the installation of the measuring instrument 1 at the time of the teaching operation and the position of the installation of the measuring instrument 1 at the time of the monitoring measurement, and further, the directional angle obtained by the coarse monitoring measurement is the same or within a predetermined threshold value with respect to the initial value, there is no change on the reflective target 5.

Figure 6B:
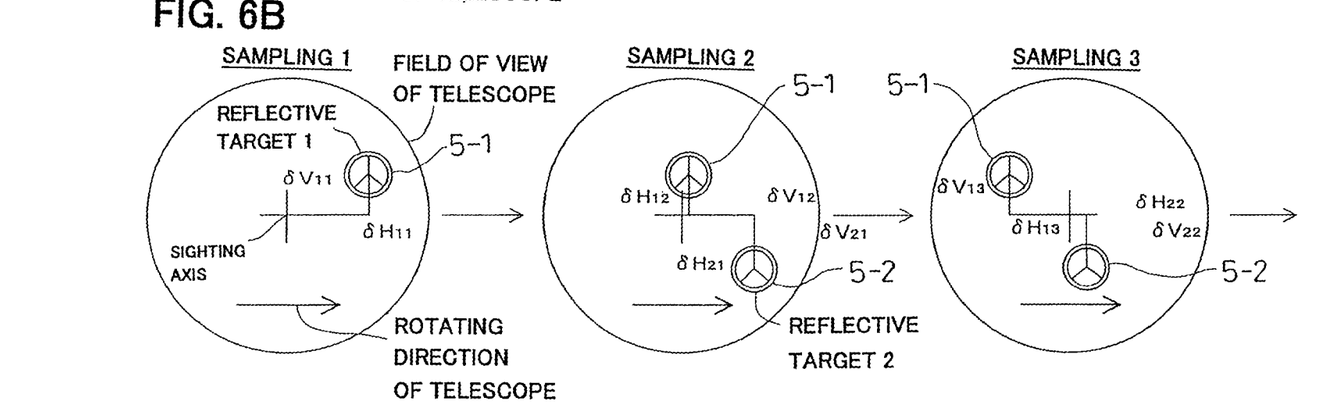

FIG. 6 (B) shows a case where two reflective targets 5-1 and 5-2 are detected in field of view of the telescope unit 2 currently being measured by the coarse monitoring measurement. When a plurality of the reflective targets 5-1 and 5-2 are included in the image, field angles ($\delta H$, $\delta V$) in the image are obtained for each of the reflective targets 5-1, 5-2 with reference to the sighting axis, and from the field angles ($\delta H$, $\delta V$) and from the directional angles (X, Y) of the sighting direction, directional angles (TH, TV) of the reflective targets 5-1 and 5-2 are determined respectively.

Then, for all of the reflective targets 5 in the searching range, directional angles are measured by coarse monitoring measurement, and the coarse monitoring measurement data are transmitted to the measuring instrument PC 3. At the measuring instrument PC 3, the coarse monitoring measurement data are compared with the initial values, and it is judged whether there is any change in the directional angle of the measuring point or not, or whether an amount of change exceeds a preset threshold value or not. If there is any change in the measuring point, or when the amount of change exceeds the threshold value, an alarm signal is transmitted from the measuring instrument PC 3 to the base station PC 6 via the communication means 7. When there is no change in the measuring point, the precise monitoring measurement is omitted, and the coarse monitoring measurement is repeatedly performed.

The threshold value in the coarse monitoring data is measured by the image processing of the image data where the directional angle of the target is detected by the image sensor 23. Accordingly, the results of the measurement are determined by giving due consideration on the resolution of the image, errors in the image processing, etc.

In the second coarse monitoring measurement, the moving of the telescope unit 2 is not stopped for each of the reflective targets 5, and one cycle of the monitoring measurement is the same as the time period of the scanning on the searching range. Accordingly, the period (cycle) of the monitoring measurement can be extensively shortened, and the quality of working is improved. In the monitoring measurement on a portion where there is more displacement or where there is rapid change, the period (cycle) of the monitoring measurement is made shorter, and the displacement of the measuring point is detected more quickly and in more reliably.

Next, description will be given on the precise monitoring measurement.

The positions in the initial state of all of the reflective targets 5, i.e. directional angles (TH, TV) of all of the reflective targets 5, are known. Therefore, based on the directional angles, the telescope unit 2 is sequentially directed to all of the reflective targets 5 in the order of the identification number.

When the telescope unit 2 is directed to the reflective target 5 and the reflective target 5 is detected by the image sensor 23, automatic sighting is carried out. Then, the sighting axis, i.e. the optical axis 12, is coincided with the reflective target 5. When the sighting is completed, distance measurement and angle measurement are performed, and the precise monitoring data are acquired. The precise monitoring data are transmitted to the measuring instrument PC 3. The monitoring data are compared with the initial value, and it is judged whether there is any change in the measuring point or not, or whether the amount of the change exceeds to the preset threshold value or not. When there is any change in the measuring point, or when the amount of change exceeds the threshold value, an alarm signal is issued from the measuring instrument PC 3 to the base station PC 6 via the communication means 7. The threshold value in the precise monitoring data is determined by giving due consideration on the measurement accuracy of the measuring instrument 1.

In the present embodiment, the monitoring measurement is performed by combining the coarse monitoring measurement with the precise monitoring measurement. Now, referring to FIG. 7, description will be given below on the monitoring measurement according to the present embodiment.

Figure 7:
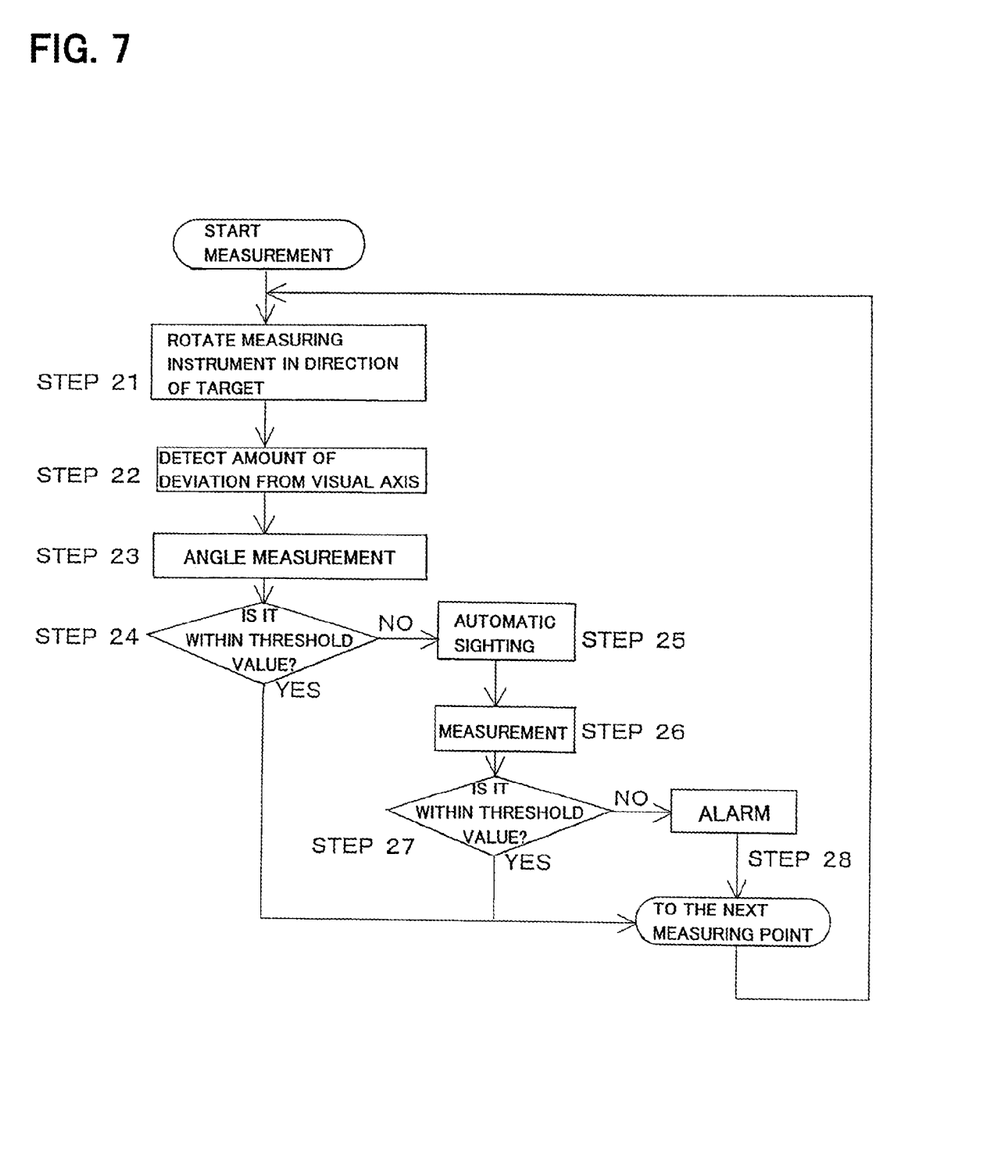
FIG. 7 is a flowchart to show a monitoring measurement according to the present embodiment.

An instruction to start the monitoring measurement is given from the measuring instrument PC 3 to the measuring instrument 1, and the monitoring measurement is started. First, the coarse monitoring measurement is carried out.

(Step 21) The measuring instrument 1 and the telescope unit 2 are directed toward the reflective target 5, and the coarse monitoring measurement is carried out.

(Step 22 and Step 23) When the reflective target 5 is detected by the image sensor 23, a deviation between the sighting axis (the optical axis 12) and the reflective target 5 in the sampling image, which is as acquired by the image sensor 23, is obtained, and directional angles (TH, TV) of the reflective target 5 are calculated.

(Step 24) The calculated directional angle of the reflective target 5 are compared with the teaching data, and a deviation is obtained. When the deviation is detected, it is judged whether this deviation value is within the range of the threshold value of the coarse monitoring data or not. If it is judged that this deviation value is within the range of the threshold value, the precise monitoring measurement is omitted, and the procedure proceeds to the next measuring point.

(Step 24, Step 25 and Step 26) In case the deviation exceeds the threshold value of the coarse monitoring data, automatic sighting is carried out. When the sighting is completed, the precise monitoring measurement is carried out. The distance measurement and the angle measurement are performed, and the precise monitoring data are acquired.

(Step 27) It is judged whether the acquired precise monitoring data is within the range of the threshold value or not.

(Step 28) In case the precise monitoring data exceeds the range of the threshold value, an alarm signal is issued, and the procedure proceeds to the next measuring point. The alarm signal is transmitted from the measuring instrument PC 3 to the base station PC 6 via the communication means 7.

If the precise monitoring data are within the range of the threshold value, it is advanced to the next measuring point. Then, it is shifted to the coarse monitoring measurement, and the monitoring measurement will be continued.

According to the present embodiment, the coarse monitoring measurement and the precise monitoring measurement are carried out in combination, and the precise measurement is performed only on the reflective target 5, which appears to be displaced or which appears to be displaced beyond the threshold value. Therefore, the monitoring measurement operation can be carried out quickly while the accuracy of the monitoring measurement is maintained at high level. As a result, the cycle of the monitoring measurement is shortened.

When the monitoring measurement is performed, exceptionally, there are some cases where the detection of the target, the automatic sighting and distance measurement cannot be performed.

The causes for the above cases may be as follows: a case where the measuring point is displaced and the reflective target 5 does not come into the field of view of the telescope, or a case where there is an obstacle (for instance, tree branches or leaves are moved by wind, or something like birds are on the tree) between the reflective target 5 and the measuring instrument 1, a case where the reflective target 5 is not correctly positioned opposite to the measuring instrument 1 from some reason, a case where posture of the measuring instrument 1 itself is changed from some reasons, a case where the measuring instrument 1 is involved in trouble during operation, etc.

Because the monitoring measurement is performed in unmanned operation, in case where the detection of the target, the automatic sighting, or the distance measurement cannot be carried out, there is no means to find out the cause. Therefore, it has been practiced in the past that a manager personally goes to the site to find out the cause.

In the second embodiment as described below, the cause of the trouble must be found at a remote point when the detection of the target, the automatic sighting, or the distance measurement cannot be carried out.

Figure 8:
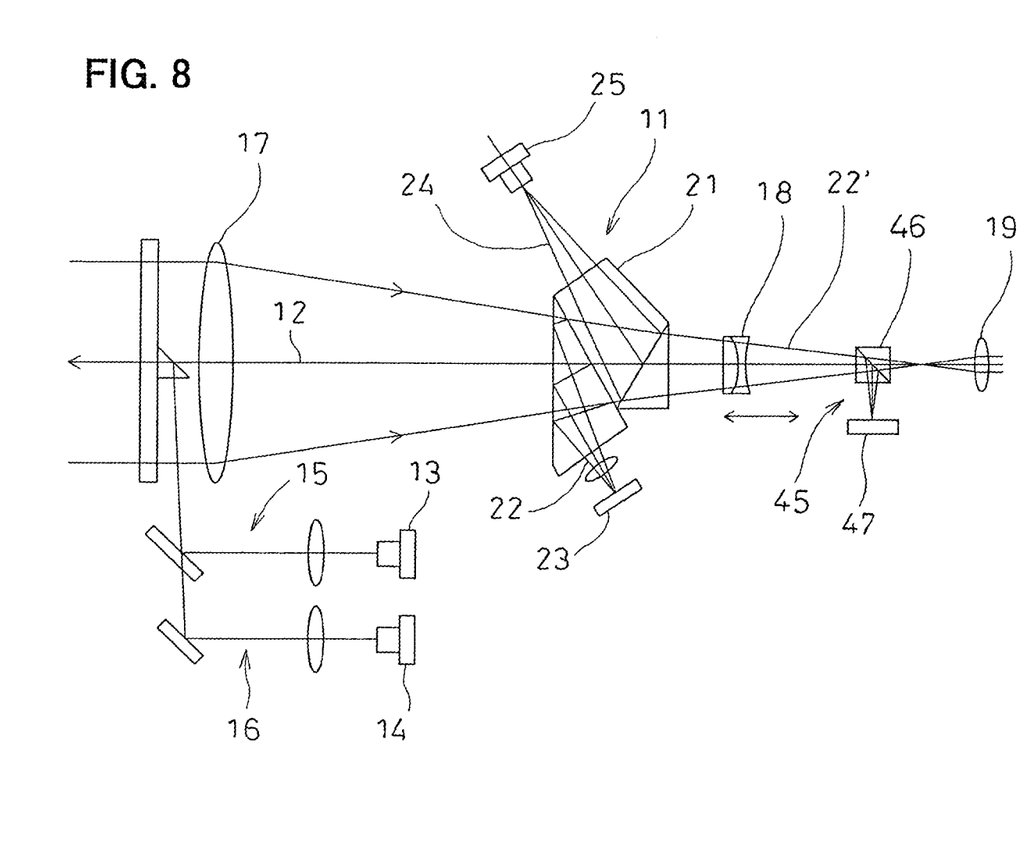
FIG. 8 is a diagram of an optical system provided on the measuring instrument in a second embodiment of the present invention.

FIG. 8 shows an optical system in the second embodiment. In FIG. 8, the same component as shown in FIG. 2 is referred by the same symbol.

In the second embodiment, an image pickup unit 45 is provided in a light receiving unit. The image pickup unit 45 has a half-mirror 46 disposed along the sighting optical axis and an image pickup element 47 mounted along a reflection optical axis from the half-mirror 46. The half-mirror 46 further divides a part of natural light 22', and a part of the natural light 22' thus divided is entered toward the image pickup element 47.

The image pickup element 47 takes a background or a background near the reflective target 5 when scanning is performed over the measurement range and acquires a digital image of the background. It would suffice if the image pickup element 47 has such degree of resolution as to be useful to identify the background. For instance, CCD or CMOS sensor of about 300,000 pixels is used for the purpose. When the image is taken by the image pickup element 47, focusing is performed by a focus lens 18. The focusing is performed during the time period when the telescope unit 2 is moving between two reflective targets 5 and 5, and attempts are made to shorten and reduce the measuring time and the time required for the image pickup operation.

Because the image pickup operation is performed to take the background of the target, in case where the detection of the target, the automatic sighting, or the distance measurement cannot be carried out, the image of the background of the target is acquired. In this case, in order to facilitate the identification of the reflective target 5 on the image, it is usually performed to take the following procedures: to change the shape of the reflective target 5, to change the color of the target, or to place a tag or a label (where number, sign, symbol mark, etc. is put) near the target.

By acquiring the image of the background, it can be judged promptly from the image of the background that tree leaves are covering reflection surface of the reflective target 5, or an optical path is intercepted by a fallen tree, or a bird is perched on the optical path.

Further, when the target is actually displaced and is extensively deviated from the position of the initial value, it is possible to easily recognize the target from the image of the background.

Figure 9:
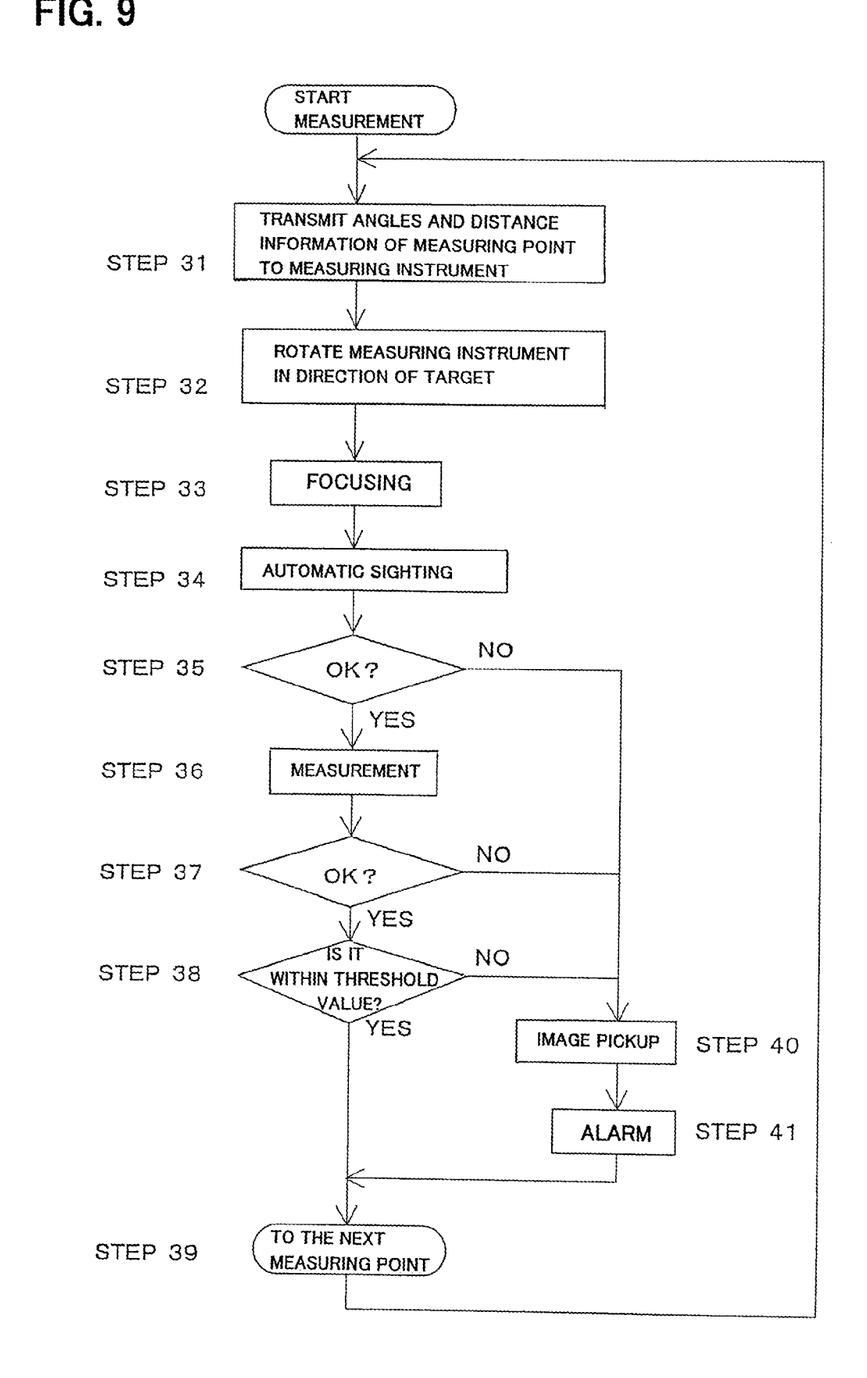
FIG. 9 represents a flowchart of the second embodiment of the present invention.

Referring to FIG. 9, description will be given on operation of the second embodiment. To facilitate the explanation, FIG. 9 shows the operation by omitting the coarse monitoring measurement.

(Step 31) From the measuring instrument PC 3, an instruction to start the monitoring measurement is issued to the measuring instrument 1. Then, information or data relating to the reflective target 5 of a first object to be measured i.e. angles of the measuring point, distance information, etc. are transmitted to the measuring instrument 1.

(Step 32) The measuring instrument 1 and the telescope unit 2 are rotated, and the telescope unit 2 is directed toward the reflective target 5.

(Step 33) During the operation, in which the telescope unit 2 is directed toward the reflective target 5, focusing of the telescope unit 2 is carried out. Because a distance to the next measuring point is known in advance from the initial value, the time required for measurement can be shortened by focusing the telescope unit 2 during the movement.

(Step 34) Based on the initial value, the telescope unit 2 is directed toward the measuring point. Further, by automatic sighting function of the measuring instrument 1, the automatic sighting is performed.

(Step 35 and Step 36) When the automatic sighting is completed, the distance measurement and the angle measurement are carried out.

(Step 36, Step 37, and Step 38) When the distance measurement and the angle measurement have been completed without any trouble, and also, when the results of the measurement are within the threshold value, the measuring instrument 1 and the telescope unit 2 are rotated and moved to the next measuring point (Step 39).

In case the automatic sighting cannot be performed in Step 35, e.g. in case the optical axis 12 is intercepted by an obstacle, the automatic sighting cannot be performed. In such case, the image of the background in the direction toward the measuring point is acquired by the image pickup unit 45 (Step 40).

Also, in case the measurement cannot be made in Step 36, or in case the result of measurement exceeds the threshold value in Step 38, the image of the background is acquired by the image pickup unit 45 (Step 40).

The image acquired in Step 40 is transmitted to the base station PC 6 from the measuring instrument PC 3 via the communication means 7. At the base station PC 6, it is so designed that, when the image of the background has been received, an alarm signal is issued (Step 41) so that the image of the background can be watched by a managing staff reliably. When the image of the background is recognized and it is of a transitory nature, the monitoring measurement is continued. If any other procedure is needed at site, the measures may be taken such as going to the site.

Further, when the measuring point is extensively displaced and it is impossible to perform the measurement, judgment can be made easily by watching the image, and rapid reaction can be taken.

With regard to the judgment of the circumstances by using the image of background in case where the measurement cannot be performed, it is needless to say that the judgement of the circumstance can be available for—not only in the case of the precise monitoring measurement but also in case of the coarse monitoring measurement.

The invention claimed is:

1. A measuring method for performing monitoring measurement on a plurality of measuring points by using a measuring instrument, which comprises a telescope unit for performing sighting of a measuring point, which is set up at a plurality of places within a measurement range, where an initial value of a set up position is already known, a distance measuring unit for measuring a distance to the measuring point by projecting a distance measuring light through said telescope unit, an image sensor for taking an image in direction of measurement and for acquiring a digital image, angle detecting units each for detecting a directional angle in sighting direction of said telescope unit, and an arithmetic unit for making said telescope unit perform automatic sighting to the measuring point and for calculating directional angles of the measuring point based on a deviation of the measuring point on the digital image from a sighting axis and based on a result of detection from said angle detecting unit, wherein said monitoring measurement comprises a coarse monitoring measurement and a precise monitoring measurement, wherein said coarse monitoring measurement acquires a digital image while scanning the measurement range and detects a directional angle of a measurement point from said digital image and said angle detecting units, wherein said precise monitoring measurement acquires a deviation between the directional angle of a measurement point acquired by the coarse monitoring measurement and a directional angle of said initial value, performs automatic sighting on said measurement point by said telescope unit based on a directional angle of said initial value with respect to the measuring point where the deviation exceeds a first threshold value, performs a distance measurement by said distance measuring unit and performs angle measurement by said angle detecting unit.

2. A measuring method according to claim 1, wherein said coarse monitoring measurement comprises setting scanning speed and image pickup time interval such that an image of the object to be measured is included in at least two digital images, being adjacent to each other in terms of time, and averaging the obtained measurement result.

3. A measuring method according to claim 1, wherein an alarm signal is issued when a deviation of the measurement result of the precise monitoring measurement from the initial value exceeds a second threshold value.

4. A measuring method according to claim 1, wherein said method comprises acquiring an image of the background in the measuring direction at the same time as the execution of the coarse monitoring measurement or as the execution of the precise monitoring measurement, and judging a non-measurable state according to an image of the background in case the coarse monitoring measurement or the precise monitoring measurement cannot be performed.

5. A measuring instrument, comprising a telescope unit for performing sighting of a measuring point, which is set up at two or more places within a measurement range, where an initial value of a set up position is already known, a distance measuring unit for measuring a distance to the measuring point by projecting a distance measuring light through said telescope unit, an image sensor for taking an image in sighting direction and for acquiring a digital image, angle detecting units each for detecting a directional angle in sighting direction of said telescope unit, an automatic sighting unit for making said telescope unit perform automatic sighting on the measuring point, an image processing unit for detecting the measuring point in the digital image and for calculating a field angle with respect to a sighting axis of a telescope, and an arithmetic unit, wherein said arithmetic unit executes scanning on the measurement range as set up by said telescope unit, and executes coarse measurement which measures directional angles of the measuring point based on the field angle of measuring points of acquired images and on the directional angles of an image sighting direction, wherein in a case with the deviation exceeds a first threshold value, automatic sighting is performed on the measuring point exceeding the first threshold value by said telescope unit based on a directional angle of said initial value, and a precise monitoring measurement is executed which carries out distance measurement and angle measurement by said distance measuring unit and said angle measuring unit.

6. A measuring instrument according to claim 5, wherein said telescope unit has an image pickup unit for taking an image of background in the measuring direction, and in case where the result of coarse monitoring measurement or the result of precise monitoring measurement cannot be obtained, said arithmetic unit acquires an image of the background in direction of the measuring point where measurement result cannot be obtained by said image pickup unit.

* * * * *